L. Bishop,
Fruit Strainer,
Nº 52,661.  Patented Feb. 20, 1866.
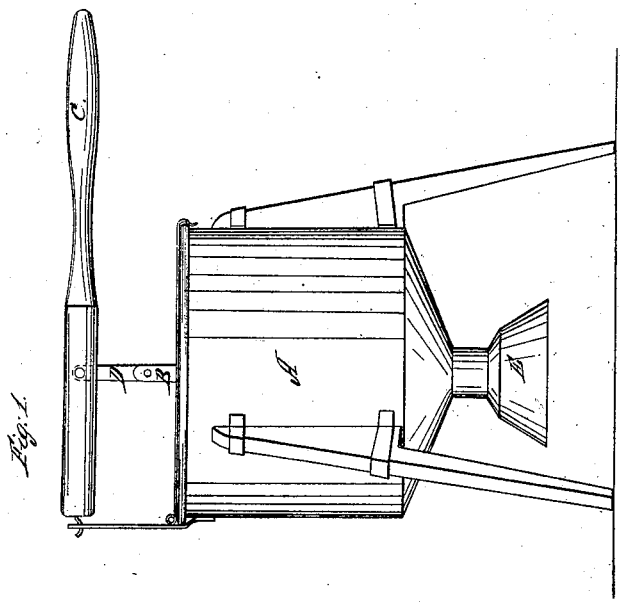
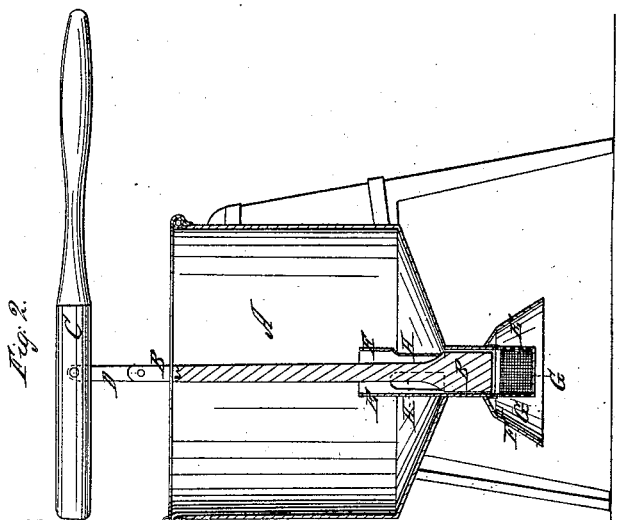

UNITED STATES PATENT OFFICE.

LUMAN BISHOP, OF CORTLANDVILLE, NEW YORK.

PRESS AND STRAINER FOR CREAM, PASTE, &c.

Specification forming part of Letters Patent No. 52,661, dated February 20, 1866.

*To all whom it may concern:*

Be it known that I, LUMAN BISHOP, of Cortlandville, in the county of Cortland and State of New York, have invented a new and useful Press Strainer and Refiner for Straining and Refining Paints, Paste, Cream, and Various other Substances; and I do hereby declare that the following is an accurate description of the construction and operation of the same, reference being had to the annexed drawings, making a part of this specification.

Figure 1 in the plate of drawings represents the machine as it appears in working order, A representing the reservoir, B the follower or piston, which, enlarged at its lower end to fit the strainer, follows and presses the substance to be strained or refined down into and through the strainer; C, the lever by which the power is applied; D, the point in the follower, whereby a directly perpendicular motion thereof is obtained; E, a guard around the strainer to prevent the paint or other substance being strained or refined from spurting out laterally onto or beyond the sides of the vessel placed underneath to receive the strained substance.

Fig. 2 represents the machine bisected, showing those parts which cannot be seen in Fig. 1. F represents the tube through which the liquid passes from the reservoir down into the strainer, the upper portion of which serves as a guide for the follower or piston when raised, to admit the liquid into the tube; G, the strainer attached to the lower end of said tube, onto which it screws. H H represent large lateral openings or apertures in the tube for the admission of the liquid from the reservoir thereinto, and so down into the strainer.

The mode of constructing and using my invention is as follows: It consists of a reservoir, A, for containing the substance to be strained or refined, usually made of tin, and about the size and shape of an ordinary water-pail, except that the bottom thereof is beveling, so as to cause the contents to gravitate toward the center, at which place a tube, F, two to four inches in diameter, comes up through, forming the outlet to the reservoir and the inlet to the strainer. This tube extends down below the bottom some five inches, and onto it is screwed the strainer G. Said strainer is made of perforated tin or wire-cloth, and of the same diameter as the tube. It is cylindrical in form and hollow, and of any desired length, from two to six inches, more or less. Its lower end is closed, having no perforations therein, the perforations being all lateral. By having the perforations lateral instead of through the bottom, I am able, by simply making my strainer longer, to obtain as large a surface or area of perforations as may be desirable in any case for the rapid transmission of the substance to be strained or refined.

Another important advantage, also, thus gained is that the inside surface of the strainer is cleaned of all obstructions and impurities at each passage of the follower or piston. These obstructions and impurities, often so coarse and hard that it is neither possible nor desirable to force them through, naturally pass down into the bottom of the strainer, where they remain until the same is detached and cleaned.

I have the strainer attached to the tube by screwing on, in order that it may be readily detached for the purpose of cleaning, and also so that a fine or coarse one may be used, adapted to the substance to be strained or refined.

The tube before mentioned passes up through the bottom of the reservoir several inches, and has several large lateral apertures, *h h h*, through which the contents of the reservoir pass down into the lower portion of said tube, and so into the strainer. This upper portion of the tube also serves as a guide for the lower end of the follower or piston as it rises to admit the liquid into the tube.

It is obvious that, instead of the continuation of the tube up into the reservoir, three or four upright wires may be arranged as a guide for the piston, the spaces between which serving to admit the liquid freely down into the tube below, or narrow strips of tin or other metal may be set up for the same purpose, which methods would, however, be simply equivalent to the one herein described and claimed.

I have a follower or piston, B, the lower end of which closely fits the tube and strainer, and which, worked by a lever, C, presses the liquid down into and through the strainer. I make a joint, D, in the follower, by which I obtain a perpendicular motion thereof. Around the strainer, and at a little distance therefrom, I have a guard, E, to prevent the liquid from spurting out onto or beyond the sides of the vessel placed underneath to receive the same.

The mode of operating my machine is as follows: The substance to be strained or refined is poured into the reservoir. The piston or follower is then raised, by means of the lever attached thereto, high enough to allow the liquid to pass down through the large lateral apertures in the upper portion of the tube and fill the tube and strainer. Then, by pressing down the follower, the liquid in the tube and strainer is forced through the perforations of the strainer. This operation is continued until the contents of the reservoir is all forced through.

What I claim as my invention, and desire to secure by Letters Patent, is—

1. The cylindrical formed strainer G, or its equivalent, with screw attachments, in combination with the tube F, as described.

2. The lateral apertures H H, or their equivalent, in combination with the tube and piston, as described.

Dated January 2, 1866.

LUMAN BISHOP.

Witnesses:
WM. C. WATROUS,
IRWIN SWAIN.